United States Patent
Southwick et al.

(10) Patent No.: US 6,691,767 B2
(45) Date of Patent: Feb. 17, 2004

(54) PLASTIC ATTACHMENT BRACKET FOR METAL HEAT EXCHANGER TANK

(75) Inventors: David A. Southwick, Lockport, NY (US); Scott Edward Kent, Albion, NY (US)

(73) Assignee: Delphi Technologies, Inc., Troy, MI (US)

( * ) Notice: Subject to any disclaimer, the term of this patent is extended or adjusted under 35 U.S.C. 154(b) by 84 days.

(21) Appl. No.: 10/170,519

(22) Filed: Jun. 13, 2002

(65) Prior Publication Data

US 2003/0230397 A1 Dec. 18, 2003

(51) Int. Cl.[7] ................................................. F28F 9/00
(52) U.S. Cl. ........................................ 165/67; 180/68.4
(58) Field of Search ............................. 165/67; 180/68.4

(56) References Cited

U.S. PATENT DOCUMENTS

| | | | | |
|---|---|---|---|---|
| 4,651,816 A | * | 3/1987 | Struss et al. ............... | 180/68.4 |
| 5,139,080 A | * | 8/1992 | Bolton et al. ............... | 180/68.4 |
| 5,992,509 A | * | 11/1999 | Fennesz ....................... | 165/67 |
| 6,207,737 B1 | | 3/2001 | Schell et al. ................ | 524/130 |
| 6,237,676 B1 | * | 5/2001 | Hasegawa et al. ............ | 165/67 |
| 6,510,891 B2 | * | 1/2003 | Anderson et al. ............ | 165/67 |

* cited by examiner

*Primary Examiner*—Terrell McKinnon
(74) *Attorney, Agent, or Firm*—Patrick M. Griffin (57) ABSTRACT

A metal heat exchanger tank has a molded plastic attachment bracket that can be secured thereto anywhere along the length of the tank with a simple press fit that is very solid. A relatively short metal flange running the length of the tank is inserted into a pocket on the plastic bracket, as cross beams in the pocket insert within notches in the flange and resilient fingers in the pocket snap into indentations in the flange. The bracket is thus preventing from pulling away from the tank or from shifting along the length of the tank. One pocket wall is long enough to cover most a flat back of the tank, which is flush to a back face of the flange, and a footer on the bracket abuts with a flat side of the tank. This gives great twisting resistance to the bracket in any direction relative to the tank.

4 Claims, 7 Drawing Sheets

PLASTIC ATTACHMENT BRACKET FOR METAL HEAT EXCHANGER TANK

TECHNICAL FIELD

This invention relates to heat exchanger attachments in general, and specifically to a plastic attachment bracket for a metal heat exchanger tank that is fixed to the tank with only a press fit, at any position desired along the length of the tank, with only a press fit and no other fasteners.

BACKGROUND OF THE INVENTION

Some automotive heat exchangers, such as radiators, have a molded plastic header tanks on two sides (or top and bottom) in which it is relatively simple to mold many additional features, such as attachment brackets to allow the tanks, and thereby the entire radiator, to be installed to the vehicle body structure. Other front mounted heat exchangers, such as condensers, typically have stamped or extruded metal header tanks in which it is more difficult to integrally form attachment brackets. Consequently, separate brackets are generally first fixed to the header tanks, and these are later used to install the tanks and heat exchanger to the vehicle body, typically by bolts and vibration isolating grommets. The separate attachment brackets are fixed to the heat exchanger tanks most often by brazing, either a separate brazing step (flame brazing) after the main core is furnace brazed, or as part of the furnace brazing process. In the latter case, the bracket is often designed to make a light snap fit around the tank, in clothespin fashion, with just enough retention force to hold it in place until it can be permanently secured by brazing.

As an alternative, metal heat exchanger tanks, such as condenser tanks, made by extrusion can be formed with an integral lengthwise flange extending out from the side which, to an extent, can be used directly as an attachment bracket. This generally entails cutting away much or most of the length and leaving behind discrete tab like remnants, which can be used as bolt hole supports or which can be slipped into to hooks integrally molded on a radiator tank. This is of limited utility, since such an extruded flange, unlike a molded plastic part, cannot be molded with a large width or with any complex features, apart from holes, notches and the like cut in after extrusion.

To date, there has been some limited use and disclosure of molded plastic attachment brackets secured to metal heat exchangers, and then used to install the heat exchanger to the vehicle body, either directly or indirectly. As shown in U.S. Pat. No. 6,207,737, FIG. 5, known plastic brackets of this type are secured to one of the ends of the tank, that is, to one of the four corners of the basically rectangular frame of the heat exchanger core. The corner provides a convenient anchoring point for such a bracket, with both vertical and horizontal surface area available for the bracket to grip onto. In other cases, however, it is desired to not be limited to the corners, and to be able to place an attachment bracket anywhere along the length of the tank.

SUMMARY OF THE INVENTION

The invention provides a molded plastic attachment bracket that can be secured anywhere along the length of a metal heat exchanger tank, combining all the benefits of a plastic molded part with holding strength equal to that of a brazed on metal attachment bracket.

In the preferred embodiment disclosed, a condenser of basically conventional shape and design has a pair of extruded aluminum header tanks, extruded symmetrically along a longitudinal axis, and each of which has a flat side face. Extruded integrally with the tank is an elongated flange, extending outwardly from the tank side face substantially perpendicular thereto, with a relatively short front face and a longer back face that is flush with the back of the tank. The flange is stamped after extruding with several narrow, open notches, perpendicular to the axis of the tank, and a number of indentations in the form of small windows adjacent to the notches. These cooperate with features of the bracket to secure it to the tank.

A plastic attachment bracket is provided for at each tank, a molded plastic part having an outboard ear adapted to be bolted to a vehicle body structure and an inboard pocket that is fixed to the tank flange by a press fit. The narrow, long bracket pocket is defined by a back wall that slidably engages the back face of the tank flange and the flush back of the tank, and a front wall that slidably engages the flange front face. The pocket front face turns out in a perpendicular footer that is abuttable with the flat side face of the tank. This allows the bracket pocket to be pressed over the tank flange closely until the footer abuts the tank. At a point that registers with each flange notch, the pocket walls are bridged by a narrow but rigid cross beam that fits closely into each notch. The pocket back wall is also molded with a series of resilient fingers, running toward the top of the pocket, each of which has a barbed end that registers with a window and, in a free state, extends into the pocket space.

The bracket is fixed to the tank by pushing the pocket over the flange in a direction generally normal to the tank axis. The flange back and front faces slide along respectively along the pocket front and back walls, as the cross beams insert into the notches and the resilient fingers are flexed out of their free state. As the pocket footer abuts the tank side face, the barbed fingers snap into to the flange windows, and the cross beams are fully inserted into the notches. With insertion complete, bracket cannot be pushed farther onto the tank, and is prevented from pulling away from the tank by the capture the resilient finger barbs in the flange windows. The bracket cannot shift in either longitudinal direction, by virtue of the insertion of the cross beams in the notches. As far as the bracket twisting around the axis of the tank, the large area of surface contact between the pocket back wall and tank back face prevents twisting in one direction, while the abutment of the pocket footer and tank side face provides the same twisting resistance in the other direction. As far as twisting of the bracket normal to the tank axis, the close fit of the flange pocket and cross beams over and into the flange and notches provides a strong, solid resistance. The net effect is that the bracket is very solidly retained to the tank, and it can be so secured to the tank anywhere along its length, not just to the corners.

BRIEF DESCRIPTION OF THE DRAWINGS

FIG. 2 is a perspective view of a flanged, extruded tank and plastic attachment bracket made according to a preferred embodiment of the invention, before the bracket is secured, viewed from the;

DESCRIPTION OF THE PREFERRED EMBODIMENT

Figure 1:
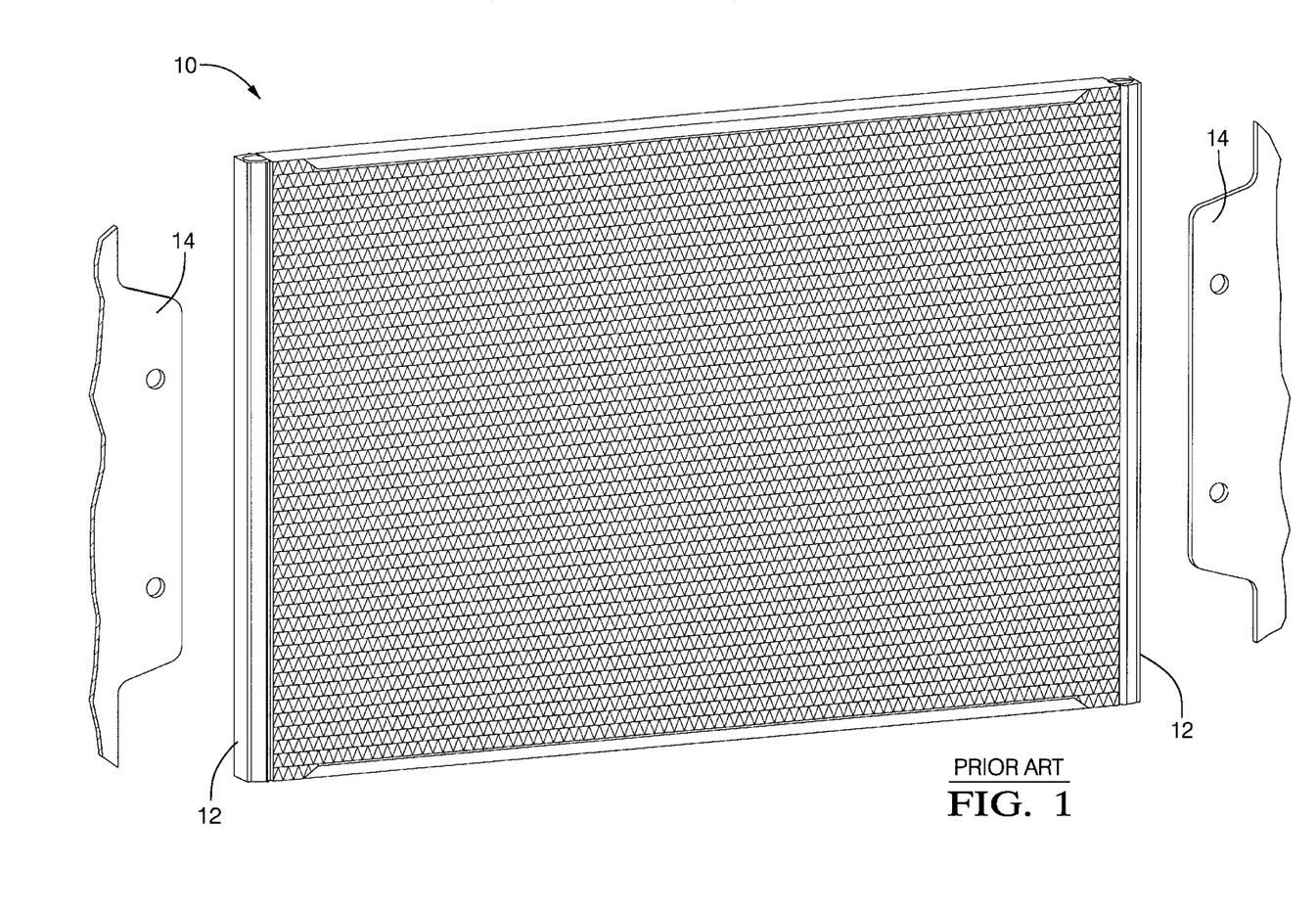
FIG. 1 is a perspective view of a heat exchanger with metal tanks in general, such as a condenser, and schematically showing a vehicle body front structure to which it is to be installed.

Referring first to FIG. 1, a metal heat exchanger, such as a condenser, is indicated generally at 10, a solid brazed core that forms a four sided frame. Condenser 10, having high internal pressure, has extruded aluminum tanks, indicated generally at 12, which are typically oriented on the sides, but could be top and bottom as well. Necessary inlets and outlet fittings and pipes are not illustrated, but are well understood in the art. Lower pressure heat exchangers, such as radiators, generally have plastic tanks, but these may be metal, as well, and the attachment scheme described is not limited to a particular type of heat exchangers, just those with tanks that are formed from a material or by a process that would make it impractical to integrally form attachment features with the tank. Also indicated schematically at 14 is a general, which could comprise any structures that were part of or otherwise solidly fixed to the vehicle body, even including a pair of radiator tanks. It will be noted that the body structure 14 forms a gap considerably wider than the side to side spacing of the tanks 12, meaning that any attachment structure secured to them will have to extend well outboard of the tanks 12, as well. Therefore, the co extrusion of a flange along the length of tank 12 alone, to be used as an attachment bracket, would be non economical in terms of cost and weight, in addition to the drawback that complex attachment features cannot be provided in a simple, straight flange of the type that can be extruded. Furthermore, this body structure 14 is located where it would not be feasible to join the corners of the condenser 10 thereto, so that known, pressed over the corners plastic brackets would be unsuitable. The invention provides a molded plastic attachment bracket that cooperates with the kind of simple flange that can be economically extruded, and which can be secured essentially anywhere along the length of tank 12 in a very simple, solid and secure fashion.

Figure 2:
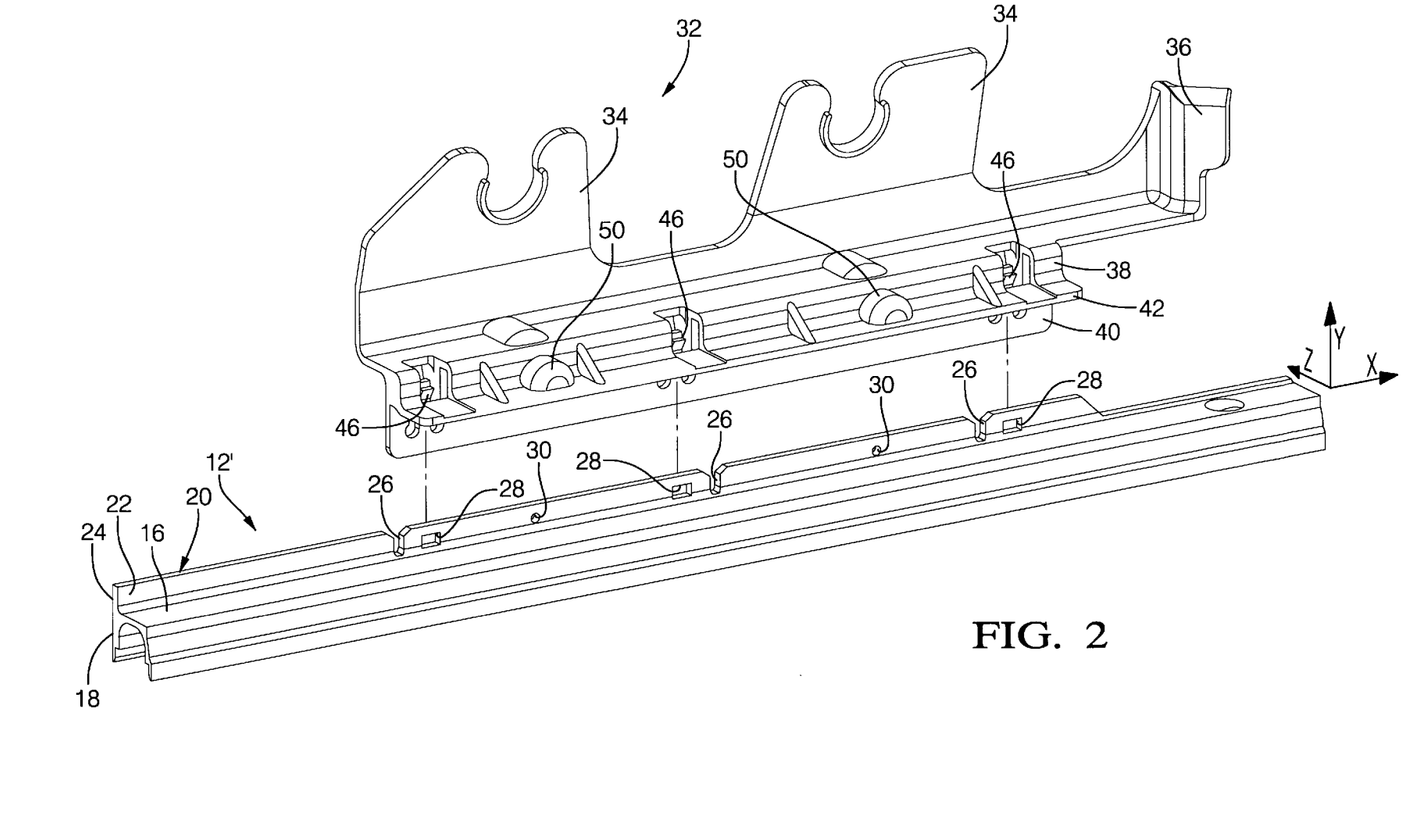
Figure 3:
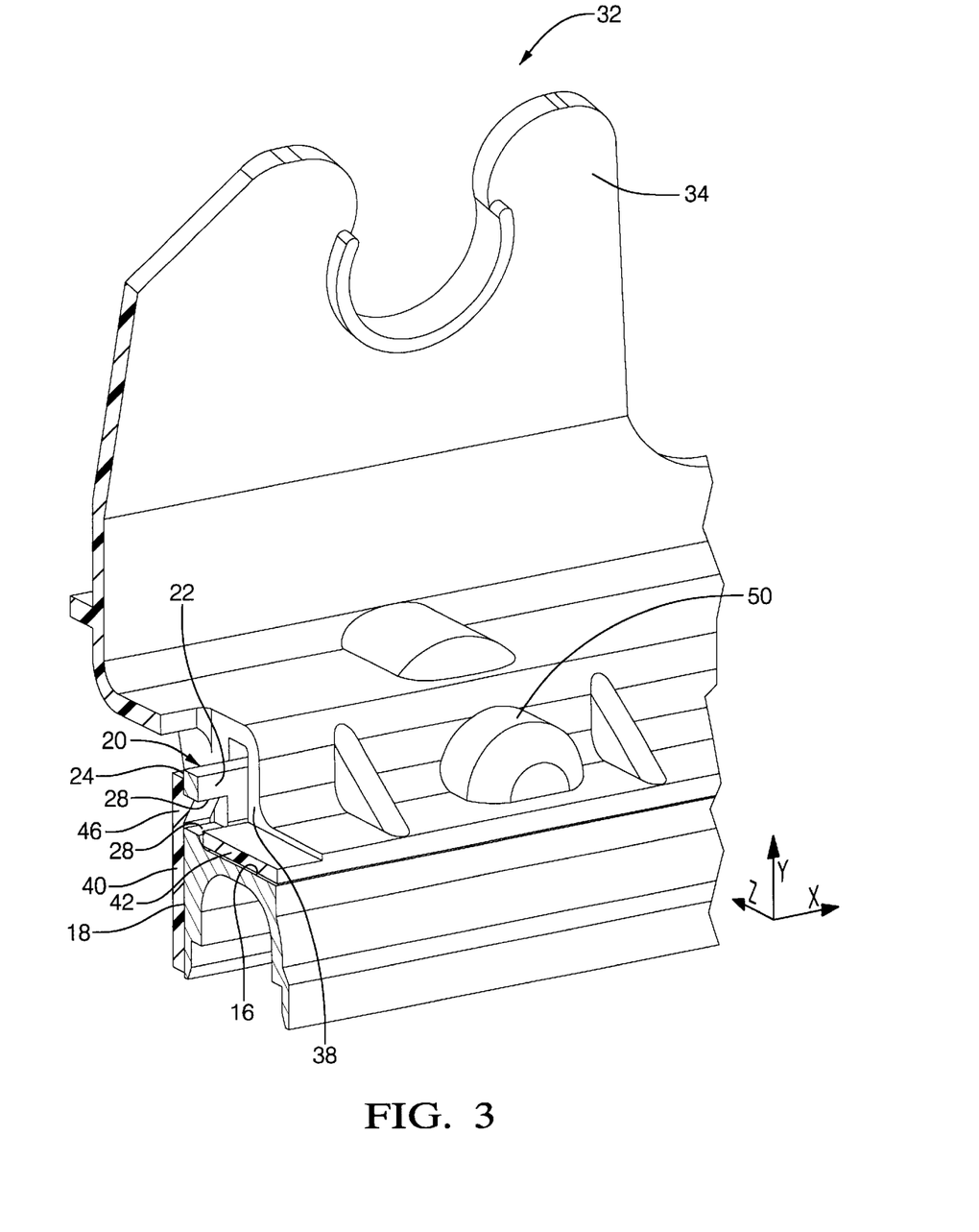
FIG. 3 is a perspective view of the back of the tank and flange in lateral cross section after the bracket has been secured to the tank.

Referring next to FIGS. 2 and 3, a single tank similar to tank 12 is illustrated, indicated at 12'. Tank 12' is extruded of a suitable aluminum, and is shown in its state before a header plate is crimped in place to handle the flow tubes of a typical core. It should be understood that, in practice, the attachment bracket of the invention would not be secured to tank 12' until a core like that shown at 10 in FIG. 1 was brazed and completed, since plastic cannot run through a braze furnace. However, the way in which the bracket is secured is identical even if applied to an unfinished tank like that shown at 12', as the attachment features are not altered in the brazing process. Tank 12' is regular in cross section as seen about its extrusion or length axis X—X, a function of the extrusion process. For convenience, the other two directions orthogonal to the length axis X—X and indicated at Y—Y and Z—Z. Tank 12' is generally U shaped in its regular cross section, with a flat side 16 and flat back 18 generally normal thereto. "Side" and "back" are arbitrary terms of course, and the back 18 could just as easily be considered the front if the tank 12' were installed to the vehicle in the other direction. The side 16, however, will always face outboard or toward the vehicle body structure 14 to which tank 12' will be ultimately attached. Co extruded with tank 12' is a short continuous flange, indicted generally at 20, which has a flat front face 22 normal to the tank side 16 and a back face 24 flush to the tank back 18. Flange 20 is relatively narrow or short, and thus does not add a lot of weight, but it is too short to serve directly and alone as an attachment bracket. Flange 20 is cut away at one end to accommodate a non illustrated inlet or outlet fitting, and is also machined at three spaced locations to provide bracket attachment features. Three open notches are cut down to the tank side 16, perpendicular to the length axis, and three indentations in the form of small rectangular windows 28 are cut through, each adjacent to a notch 26. At two points along the length of flange 20, a pair of service screw holes 30 are provided, for a purpose described below.

Figure 4:
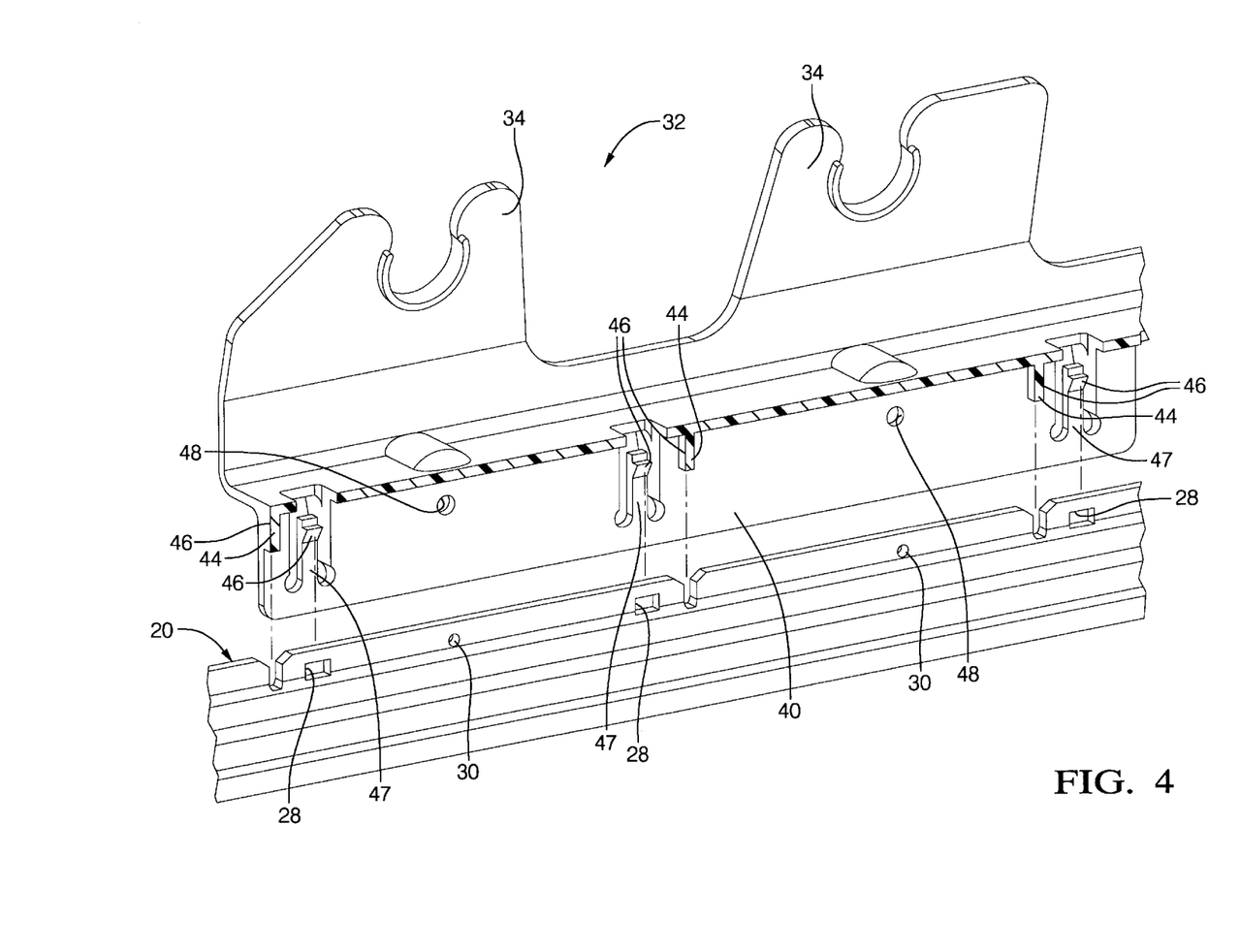
FIG. 4 is an enlarged lengthwise cross section of the bracket and tank flange before the bracket has been secured.

Still referring to FIGS. 2 through 4, and FIG. 7, a molded plastic attachment bracket, indicated generally at 32, unlike the tank flange 20, can be molded with any number of fairly complex attachment features, and still be very low cost and light weight, in spite of being far wider than flange 20. As such, bracket 32 has a pair of outboard ears 34 adapted to be bolted to the body structure 14 described above, as well as a leg 36 for supporting an inlet or outlet pipe, and other features not described here. But it can be secured to tank 12' as solidly as if it were an integral part of flange 20. To that end, a pocket that secures to flange 20 comprises a front wall 38 and back wall 40, which are spaced apart the proper distance to slidably engage the flange front and back faces 22 and 24 respectively. In the embodiment disclosed, the back wall 40 has extra length, enough to slidably engage the flush tank back 18, as well, and the front wall 38 turns out into a perpendicular footer 42 that is abuttable with the tank side 16. As best seen in FIG. 4, the pocket walls 38 and 40 are bridged at three locations by thin cross beams 44 that are the proper size and spacing to fit closely into the flange notches 26. Next to each cross beam 44, and molded integrally out of the back wall 40, is a resilient, cantilevered barbed finger 46 the length of which is normal to the axis X—X and which extends in a direction from near the bottom of back wall 40 toward and ultimately above the footer 42. This orientation locates the integral hinge point 47 of the finger below footer 42 and ultimately below the plane of tank side 16. Each finger 46 is located so that its barbed end registers with a respective flange window 28 when the cross beams 44 are registered with respective flange notches 26 and, in a free state, the barbed ends extend into the narrow spaced between the pocket walls 38 and 40. In addition, in the embodiment disclosed, a service screw hole 48 registrable with a flange service screw hole 30 is molded through the pocket back wall 40, and tool access around it is provided by a semi cylindrical clearance shroud 50.

Figure 5:
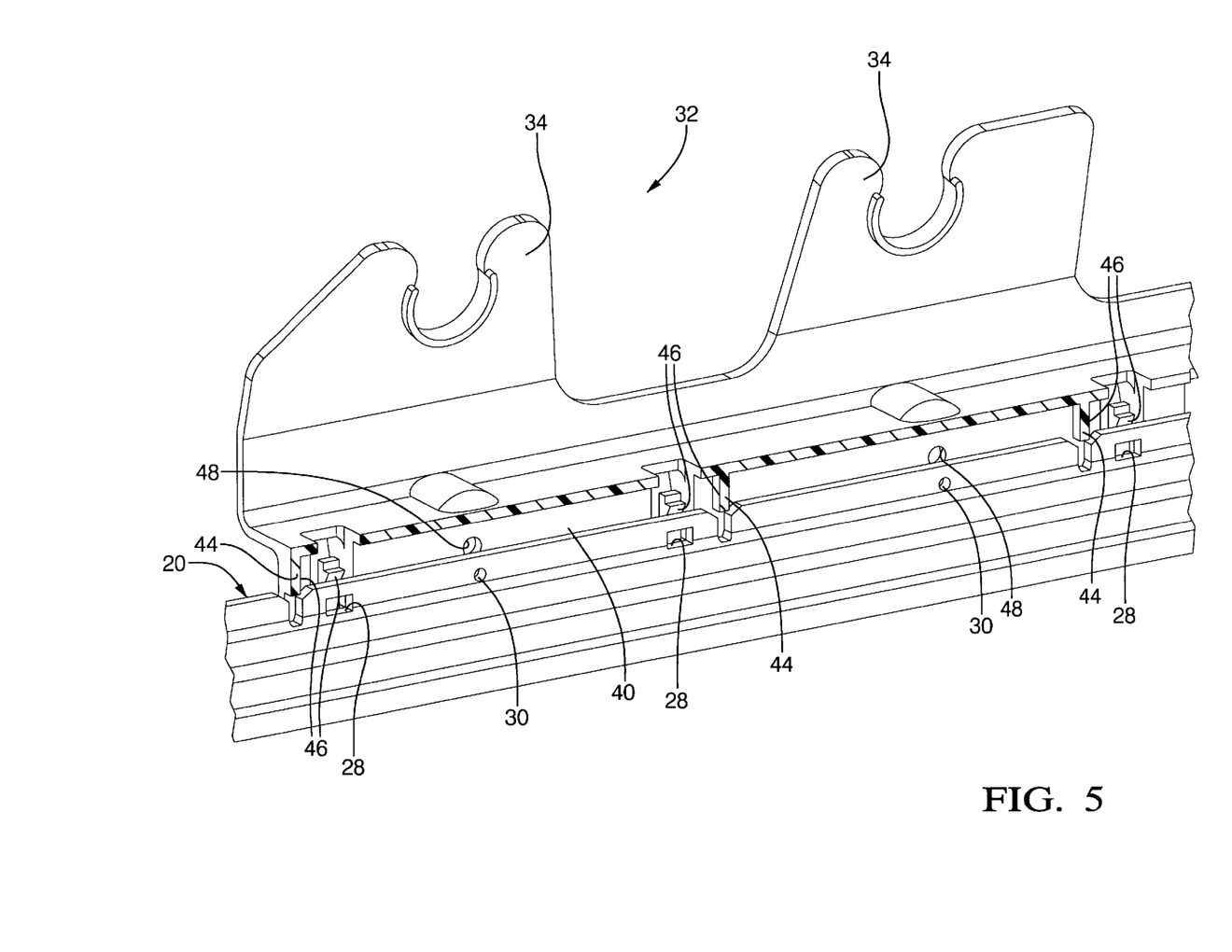
FIG. 5 shows the bracket being pushed in place.
Figure 6:
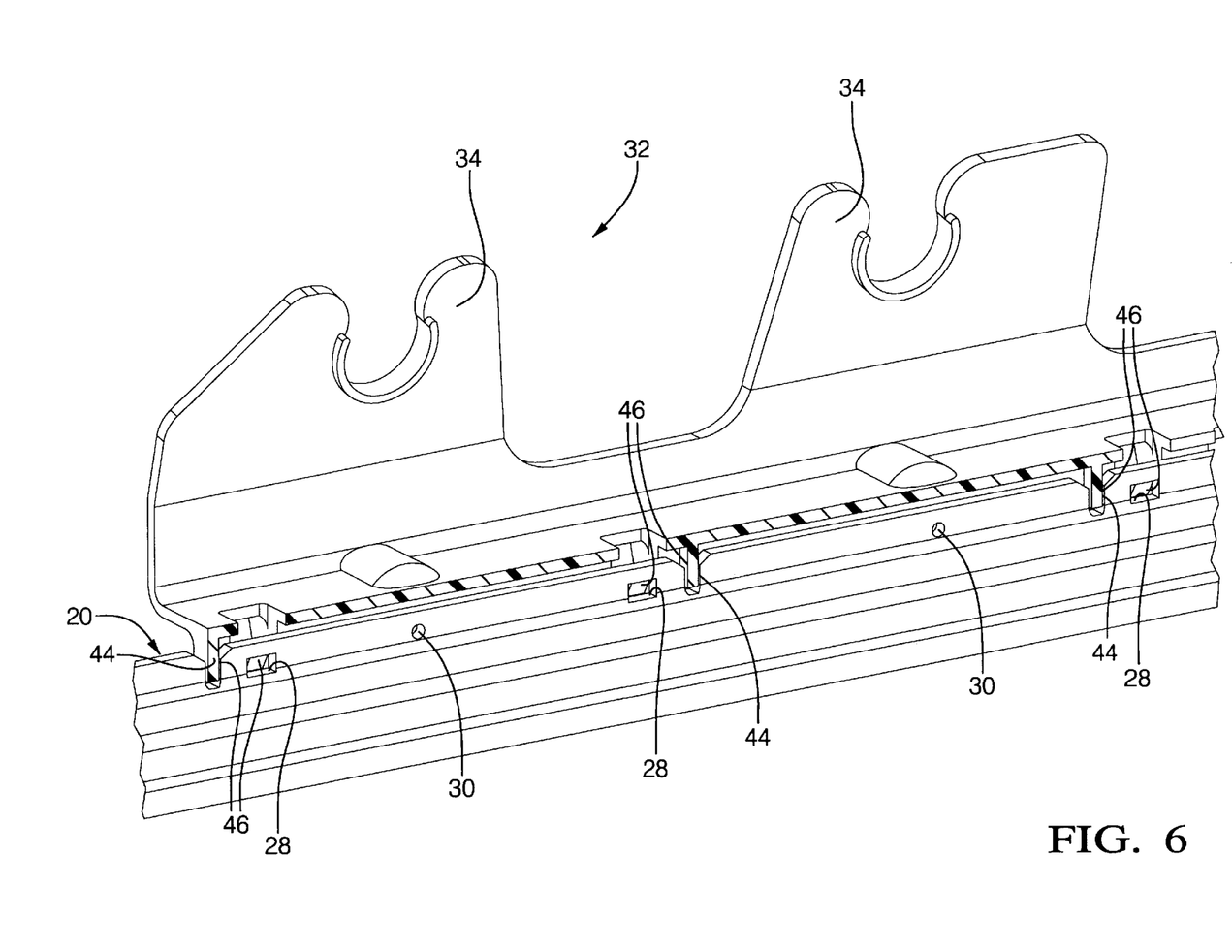
FIG. 6 shows the bracket pushed fully into place.

Referring next to FIGS. 4 through 6, the securement of bracket 32 to tank 12' is illustrated. Bracket 32 is pushed toward tank 12', generally along the Y—Y axis. By feel, or through apparatus pre-alignment, the pocket cross beams 44 are aligned with and slide into the notches 26, closely but without significant resistance, and the resilient fingers 46 are pushed back out of their free state as they slide along the flange back face 24. Concurrently, the pocket front and back walls 38 and 40 slide down along the flange front and back faces 22 and 24 until the footer 42 abuts the tank side 16. Back wall 40 is long enough, as noted, to slide down along the tank back 18. As the footer 42 hits, the ends of the barbed fingers 46 snap back to their free state and into the flange windows 28.

Referring next to FIG. 3, bracket 32 is now fully and solidly secured. As seen in FIG. 3, a force tending to pull bracket 32 away from tank 12', in one direction along Y—Y, would be resisted by the trapping of the ends of the fingers 46 within the flange windows 28. While this does not represent a great deal of contacting surface area, it is more than sufficient to resist any pull out forces that bracket 32 will see during shipping, and before final installation to the vehicle. In the opposite direction along Y—Y, bracket 32 is solidly held by the abutment of footer 42 to tank side 16, over a great deal of contacting surface area. In either direction along the X—X longitudinal axis, the cross beams 44 resting closely in the flange notches 26 prevent any significant motion or rattle. In the Z—Z direction, bracket 32 is prevented from shifting by the close confinement of flange 20 between the pocket walls 38 and 40, which also represents a good deal of mutually contacting surface area. The major disturbance to which bracket 32 is likely to be subjected, especially during pre installation shipping, is twisting about the X—X axis, as shown by the two curved arrows in FIG. 3. In the counterclockwise direction, where the shorter pocket wall 38 is driven into the flange front face 22, twisting is strongly resisted by the abutment of footer 42 with tank side 16. Twisting forces in that direction would also tend to push the ends of the fingers 46 farther into the windows 28, rather than dislodging them, since the bracket would tend to rock about the fulcrum of the footer 42 resting on the tank side 16, and the end of finger 46 is located above that plane. Twisting forces in the clockwise direction would be resisted by the abutment of the longer pocket back wall 40 with both the flange back face 24 and the tank back 18. While twisting in this direction would tend to dislodge the fingers 46, the large mutual surface area contact between pocket back wall 40 and tank back 18, located below the ends of the fingers 46, would strongly resist and prevent any such dislodging. The net effect is that bracket 32 is secured to tank 12' so solidly that material strength, of either flange 20 or bracket 32 itself, would have to be overcome before dislodging occurred, and the materials are more than strong enough to prevent that under ordinary circumstances. The bracket 32 as shown has been tested under severe conditions, and has not failed, despite being secured by only a press fit with no external fasteners, brazing or adhesive.

Referring again to FIG. 1, once the brackets 32 are installed to the body structure 14, typically by grommeted bolts through ears 34, the tanks 12' and whatever type of heat exchanger core was contained between them would be effectively trapped against any side to side movement, or any twisting within the plane of the core, by the close confinement of both of the tank sides 16 between the bracket footers 42. At that point, the pull off resistance of the barbed fingers 46 would become redundant. Up and down shifting of the heat exchanger would be resisted still by the cross beams 44 in the flange notches 26, six such pairs altogether, which is more than sufficient. Any twisting of the core out of its plane would be powerfully resisted, as noted above, by the large area of mutual surface contact between the tank sides 16, bracket footers 42, and between the tank flanges 20 and the pocket walls 38 and 40. Again, materials would fail or break before the tanks 12' were dislodged from the brackets 32.

Figure 7:
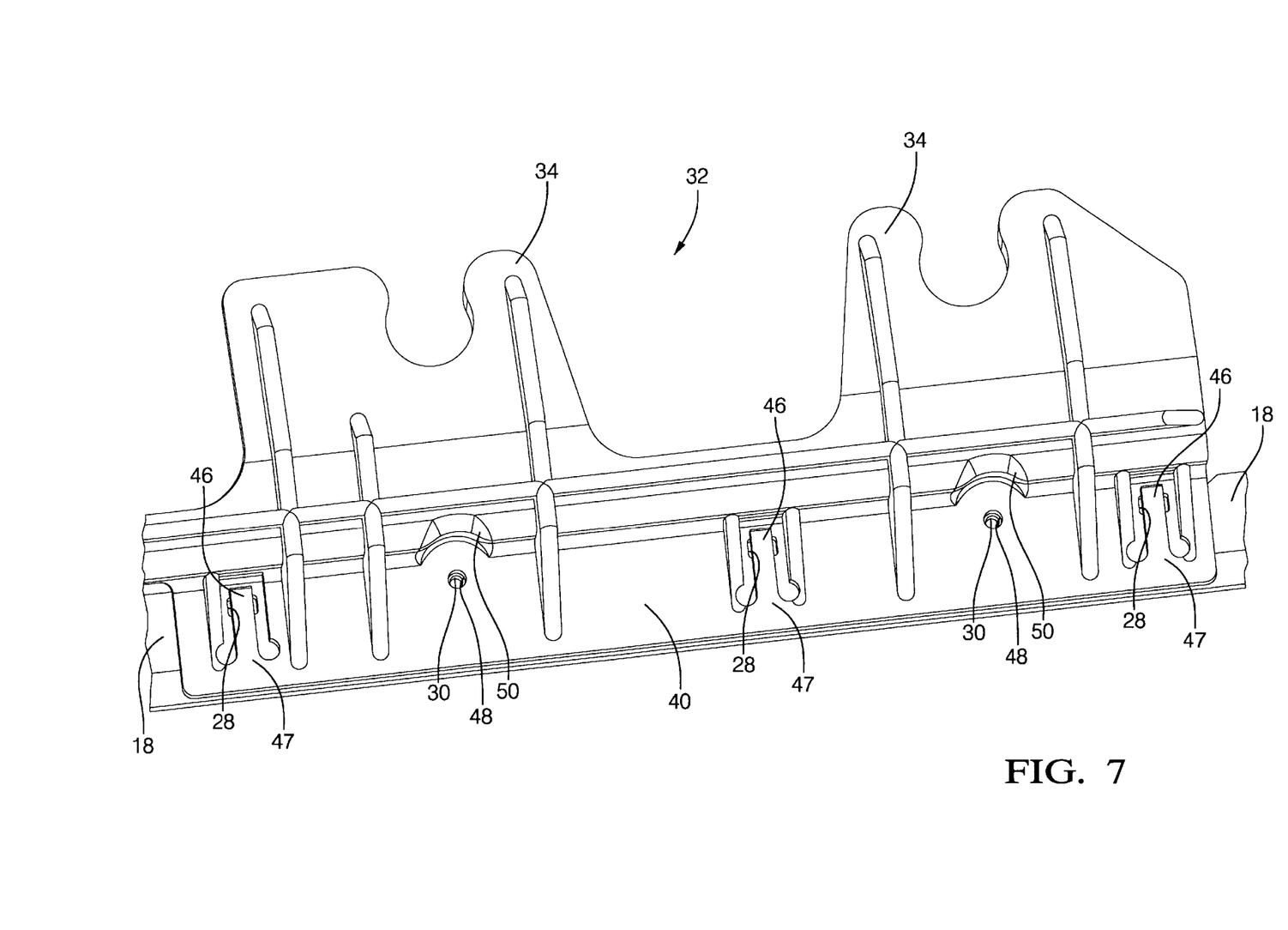
FIG. 7 shows the bracket in place, viewed from the opposite direction of FIG. 6.

Referring next to FIG. 7, in the event that it was desired to deliberately remove a bracket 32 from a tank 12', and then to re secure it in order to re install to the vehicle body structure 14, the resilient fingers 46 might be damaged or broken in the process, although the rest of bracket 32 would be preserved. In that case, when the bracket 32 was re inserted between the pocket walls 38 and 40, the tank flange service screw holes 30 would re align with the bracket service screw holes 48, as shown. Screws could be driven through them, retaining bracket 32 against pull off, just as the barbed fingers 46 had done. The clearance shrouds 50 provide access to do that, and the pre provision of the aligned service holes assures that a screw would not be mistakenly driven into the interior of the tank 12'.

Variations in the disclosed embodiment could be made. The brackets and tanks could be arrayed at top and bottom, rather than on the sides. A single bracket like 32 could be used on only one tank, if some alternate provision existed for installing the other side. More or fewer sets of cross beams, resilient members and indentations could be used, depending on how much removal and shifting resistance was desired, although at least two sets would be desirable, because of the extra twisting resistance provided. A simpler pocket on the bracket could consist of a back wall 40 no longer than the front wall 38, which could also be simply straight, without the out turned footer 42. The bottom edge of such a simple front wall could act as an abutting stop member against the tank side 16. Such a simpler, shorter pocket would cover only the flange 20, without the extra twisting resistance provided by the engagement of the longer back wall 40 with the tank back 18 and the abutment of the footer 42 with the tank side 16. The flange 20 alone would still provide a good deal of twisting resistance in conjunction with a bracket pocket short enough to cover only the flange 20, however, and the pull off resistance of the fingers 46 and the up and down shifting resistance provided by the cross beams 44 would remain the same. Indentations other than a complete through window 28 could provide anchoring points for resilient members. In addition, resilient members other than the fingers 46 could be used, but the fingers 46 as disclosed provide a number of particular advantages, especially taking advantage of the length made possible by the relatively long pocket back wall 40. The extra length gives additional flexibility while bracket 32 is being secured (shorter fingers would be stiffer). Further more, the particular orientation shown for the fingers 46, being formed in the longer pocket wall 40 and with the integral hinge point 47 below the plane of the tank side 16, means that the finger is driven more deeply into the window when the bracket pocket's shorter wall 38 is twisted into the flange 20, the pocket wall that would inherently provide less twisting resistance. The bracket 32, in effect, makes maximum use of the pre existing shape of the tank to create a solid securement.

What is claimed is:

1. In a heat exchanger having at least one side header tank with a length arrayed along a central longitudinal axis and which is intended to be attached to a vehicle body structure, an attachment system, comprising, a planar attachment flange on said header tank arrayed parallel to said longitudinal axis and substantially perpendicular to said tank and having a front face extending upwardly from said tank and an opposed back face, said attachment flange further having at least one open notch extending through said upper edge and at least one discrete indentation formed in one face and spaced away from said notch, and, a plastic attachment bracket having an outboard ear adapted to be joined to said vehicle body structure and an inboard pocket defined by a back wall slidably engageable with said attachment flange back face and a front wall slidably engageable with said attachment flange front face and abuttable with said tank, said pocket further including a cross beam closely insertable in said attachment flange notch, said bracket also having a resilient finger formed on one of said walls that extends into said pocket in a free state and which is registrable with said attachment flange indentation when said flange pocket front wall and tank are abutted, whereby said bracket may be fixed to said header tank by pushing said attachment flange into said pocket in a direction generally normal to said tank axis as said flange back and front faces slide along said pocket front and back walls respectively and said cross beam slides concurrently into said notch until said pocket front wall and tank abut, said resilient finger concurrently flexing out of its free state until registering with and entering said indentation, after which said bracket is prevented from pulling away said tank by the engagement of said resilient finger and indentation and is prevent from pushing farther toward said tank by the abutment of pocket front wall and tank, and is prevented from twisting relative to said tank by the engagement of said flange front and back faces with said pocket front and back walls respectively.

2. An attachment system according to claim 1, in which said tank has a flat side and said planar attachment flange is substantially perpendicular to said flat side, and in which said pocket front wall has a footer arrayed substantially perpendicular thereto and which is abuttable with said tank flat side.

3. An attachment system according to claim 2, in which said tank further includes a flat back flush with said planar attachment flange back face, and in which said bracket pocket back wall is sufficiently long to slidably engage with said tank back.

4. An attachment system according to claim 3 in which said resilient finger is formed on said pocket back wall and extends from a hinge point below said footer to an end above said footer.

* * * * *